Feb. 1, 1938.  W. B. BARNES  2,106,905
OVERSPEED DRIVE NO BACK LOCKOUT
Filed Jan. 8, 1934

INVENTOR.
William B. Barnes,
BY
Hood + Hahn.
ATTORNEYS

Patented Feb. 1, 1938

2,106,905

UNITED STATES PATENT OFFICE 2,106,905

OVERSPEED DRIVE NO BACK LOCKOUT

William B. Barnes, Indianapolis, Ind.

Application January 8, 1934, Serial No. 705,786

7 Claims. (Cl. 74—290)

My invention relates to improvements in transmissions and particularly to a type of transmission wherein there is provided gearing for effecting an overspeed drive of the propeller shaft and there is also provided an overrunning clutch to permit, when the parts of the transmission are in a predetermined position, a "free wheeling" of the vehicle.

In certain types of transmissions of this character which is particularly adapted for use in connection with the standard type of transmission, when the driving shaft of the overdrive transmission is driven in a reverse direction, through a reverse drive of the standard transmission, there is a tendency for the parts to lock-up.

It is one of the objects of my invention to provide means whereby in this type of transmission when a reverse drive is effected, to prevent this locking up of the overspeed drive.

For the purpose of disclosing my invention I have illustrated certain embodiments thereof in the accompanying drawing in which Fig. 1 is a longitudinal sectional view of an overspeed transmission embodying my invention;

Figure 1:
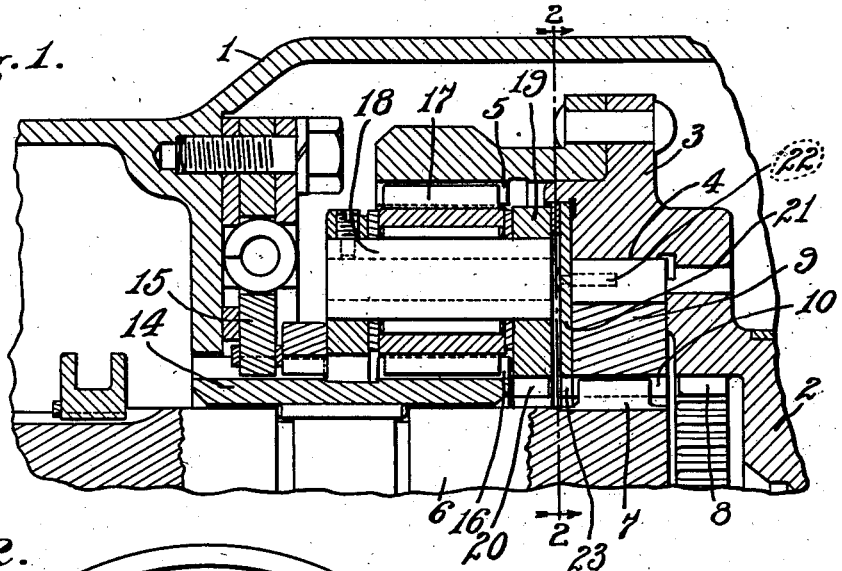

In the embodiment of the invention illustrated I have provided an overspeed drive, which is preferably enclosed in the casing 1 and is adapted to be attached to the rear end of the standard transmission of an automobile vehicle having three speeds forward and one reverse. In the overspeed structure shown the propeller shaft 2, which is adapted to drive the rear wheels of the vehicle through the usual differential, is provided with an overhanging portion 3 constituting one member 4 of an overrunning clutch. This propeller shaft 2 has also secured on the member 3 a ring gear 5 of a planetary overspeed drive. The driving shaft 6 of the transmission has a connection with the shaft of the standard transmission which, while causing the two shafts to rotate in unison, will permit of an axial movement of the shaft 6. This driving shaft is provided with clutch teeth 7, at its outer end, adapted when the shaft is moved to its right-hand limit, looking at Fig. 1, to engage in internal teeth 8 on the member 3, whereby a direct drive is established between the shaft 6 and the shaft 2. Surrounding the shaft 6 is the inner member 9 of an overrunning clutch connected with the shaft 6 through the instrumentality of teeth 10 on the clutch member and teeth 7 on the shaft 6. This inner member is provided with a plurality of cam surfaces 12 between which and the inner surface of the outer member 4 of the clutch are interposed suitable clutch rollers 13.

Surrounding the shaft 6 is a sleeve 14 held against rotation by a sound-deadening connection 15 with the casing 1 and this sleeve is provided with a sun gear 16. Interposed between the sun gear 16 and the ring gear 5 are pinion gears 17 mounted on pins 18 supported from a pinion carrier 19 having internal teeth 20 adapted, when the shaft 6 is shifted to its left-hand limit, looking at Fig. 1, to mesh with the teeth 7 of the shaft 6.

Figure 2:
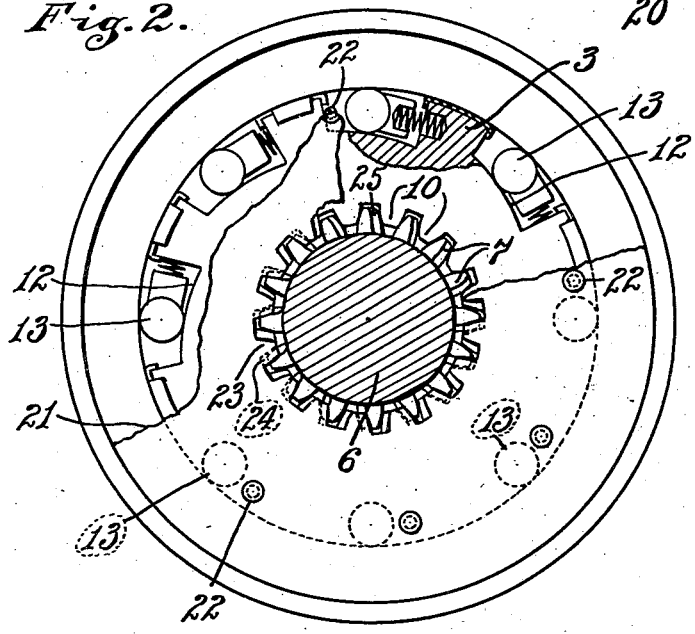
Fig. 2 is a transverse sectional view on the line 2—2 of Fig. 1.
Figure 3:
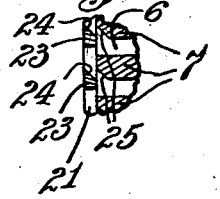
Fig. 3 is a detail view of the means for preventing a lockup of the drive.

With the above construction it will be seen that when the shaft 6 engages the teeth 7 thereof with the teeth 8 on the shaft 2 a direct two-way drive will be establised between the shafts. When, however, the shaft 6 is axially shifted slightly to the left to disengage the teeth 7 from the teeth 8 a direct one-way drive is established between the shaft 6 and the shaft 2 through the overrunning clutch. By shifting the shaft 6 to its left-hand limit the teeth 7 engage the teeth 20 on the pinion carrier 19 and a two-way overspeed drive is established between the shaft 6 and the shaft 2 through the planetary gearing. The outer member 3 of the overrunning clutch, under these circumstances, is being driven faster than the inner member 9. However, the direction of rotation of this outer member is in a clockwise direction, looking at Fig. 2, and therefore the rollers 13 will be moved to a disengaging position so that the overrunning clutch will be ineffective and therefore will not affect the operation of the parts.

However, with the overspeed drive in effect, in event the direction of rotation of the shaft 6 is reversed, as would be the case where the standard transmission were shifted into reverse drive, the tendency would be to drive the outer member of the overrunning clutch in a counter-clockwise direction at a greater speed than the inner member and as a result the overrunning clutch would come into operation causing the parts to lock up and prevent such drive.

In order to prevent such a contingency arising I interpose between the pinion carrier 19 and the face of the member 3 a washer or annular ring 21 provided with pins 22 which project rearwardly and behind each of the rollers 13. This ring, when the overrunning clutch is in normal operation, that is, when the parts are in free wheeling position, and associated pins, will not affect in any way the operation of the clutch. The inner portion of the ring is provided with a plurality of teeth 23 having their ends chamfered as at 24 and these teeth are in a position to be engaged by the teeth 7 on the shaft 6. The front edges of the teeth 7 are likewise chamfered as at 25 so that when the shaft 6 is shifted axially to the left, looking at Fig. 1, the teeth 7 engaging the teeth 23 will lock the ring or washer 21 against relative rotation and in a position to place the pins 22 behind the rollers 13 in such a position as to prevent the rollers from moving into engaging position, thus preventing the overrunning clutch from operating in either direction. Due to the chamfering of the teeth 23 and the teeth 7, if the ring has rotated slightly in a direction to permit the rollers 13 to operate, the teeth 11 and the teeth 24 may readily engage and the ring rotated in an opposite direction. Therefore, when parts are in overspeed drive position the overrunning clutch is rendered inoperative in either direction so that in event a reverse drive is effected, through the overspeed drive gearing, the overrunning clutch will not engage and the parts are thus prevented from locking up.

I claim as my invention:

1. In a transmission, the combination with a driving and a driven shaft, of an overspeed gearing for drivingly connecting said shafts, a one-way clutch for drivingly connecting said shafts, one of the members of said clutch being in constant driving connection with one of the gears of said gearing and another member of said clutch being in constant driving connection with the driving shaft, and means for rendering said one-way clutch inoperative in either direction of rotation when the shafts are drivingly connected through said overspeed gearing.

2. In a transmission, the combination with driving and driven shafts, of an overspeed gearing including a gear constantly connected to said driven shaft for drivingly connecting said driving and driven shafts, a one-way clutch for drivingly connected said shafts including a member connected to said driven shaft and means for rendering said one-way clutch inoperative in either direction of rotation when the shafts are drivingly connected through said overspeed gearing.

3. In a transmission, the combination with a driving and a driven shaft, of an overspeed gearing for drivingly connecting said shafts including a gear constantly connected to the driven shaft, a one-way clutch for drivingly connecting said shafts including a member constantly connected to the driven shaft and shiftable means for selectively establishing a drive through said gearing or through said one-way clutch and means operated by the said shiftable means for connecting said shafts through said overspeed gearing for rendering said one-way clutch inoperative in either direction of rotation.

4. In a transmission, the combination with driving and driven shafts, of an overspeed gearing of the planetary type including a ring gear connected to said driven shaft for drivingly connecting said shafts, a one-way clutch including one member connected to said driven shaft, means for selectively establishing a drive between said shafts through said gearing or through said clutch and means for rendering said one-way clutch inoperative in either direction of rotation when the drive is established through said gearing.

5. In a transmission, the combination with a driving shaft and a driven shaft, of a gearing for drivingly connecting said shafts, including a ring gear connected to the driven shaft, pinion gears adapted to be drivingly connected to the driving shaft and a stationary sun gear, a one-way clutch including a member connected to the driven shaft and a second member adapted to be connected to the driving shaft, means for selectively driving the driven shaft through said overspeed gearing or said one-way clutch, and means for rendering said one-way clutch inoperative in either direction of rotation when the driving connection is established through said gearing.

6. In a transmission, the combination with driving and driven shafts, of a gearing for drivingly connecting said shafts, comprising a ring gear connected to said driven shaft, a sun gear stationarily mounted, pinion gears interposed between said sun and ring gear, means for connecting said pinion gears to the driving shaft, an overrunning clutch including an outer member connected to the driven shaft, an inner member adapted to be connected to the driving shaft, clutch rollers interposed between said members, stop members and means for moving said stop members in a position to prevent the operation of said rollers when driving connection is effected through said gearing.

7. In a transmission, the combination with driving and driven shafts, of a ring gear connected to the driven shaft, a sun gear stationarily mounted, pinion gears interposed between said sun and ring gears, an outer member of an overrunning clutch connected to the driven shaft, an inner member of the overrunning clutch adapted to be connected to the driving shaft, clutch rollers interposed between said members, stop members and means for moving said stop members to a position to render said rollers inoperative upon the establishment of a driving connection between said pinions with said driving shaft.

WILLIAM B. BARNES.